United States Patent [19]
Sharon et al.

[11] Patent Number: 6,137,782
[45] Date of Patent: Oct. 24, 2000

[54] AUTOMATIC NETWORK TRAFFIC ANALYSIS

[76] Inventors: Azulai Sharon, 1035 Aster Ave. #2198, Sunnyvale, Calif. 94086; Ran Levy, 8 Palmach Street, Herzliya, Israel; Yaacov Cohen, 27 Lochamay Hagetaot Street, Petah Tikva, Israel; Alexander Haiut, 10/30 Mor Street, Tel Aviv, Israel; Ariel Stroh, 10 Hadudaim Street, Kfar Saba, Israel; David Raz, 13 David Elazar Street, Nes-Ziona, Israel

[21] Appl. No.: 09/334,675

[22] Filed: Jun. 17, 1999

Related U.S. Application Data

[63] Continuation-in-part of application No. 09/285,099, Apr. 2, 1999.
[60] Provisional application No. 60/093,646, Jul. 21, 1998.
[51] Int. Cl.[7] .................. G06F 15/173; G06F 15/177; H04L 12/28; H04L 12/26; G01R 31/08
[52] U.S. Cl. .................. 370/255; 709/221; 709/238; 370/244
[58] Field of Search ................. 370/254, 255, 370/400, 401, 402, 403, 408, 389, 241, 242, 244, 253; 709/220, 223, 238, 221

[56] References Cited

U.S. PATENT DOCUMENTS

| | | | |
|---|---|---|---|
| 5,430,709 | 7/1995 | Galloway | 370/241 |
| 5,568,471 | 10/1996 | Hershey et al. | 370/245 |
| 5,768,552 | 6/1998 | Jacoby | 709/224 |

*Primary Examiner*—Huy D. Vu
*Assistant Examiner*—Kevin C. Harper
*Attorney, Agent, or Firm*—Mark M. Friedman

[57] ABSTRACT

A system and a method for automatic analysis of the traffic topology map of the network, by correlating information from agents which are in communication with the network. The physical topology map is preferably used as a foundation for the traffic mapping process, in order to indicate how the physical components are connected. Preferably, the traffic information is gathered through the operation of a plurality of agents, which are distributed throughout the network according to the physical topology map and which are operated by a computer or other electronic device connected to the network. The traffic mapping process then analyzes the traffic flow between the agents. Thus, the exact process by which the physical topology map is determined is not important.

31 Claims, 9 Drawing Sheets

AUTOMATIC NETWORK TRAFFIC ANALYSIS

This Application is a Continuation-in-Part Application of U.S. Provisional Application No. 60/093,646, filed on Jul. 21, 1998, and of U.S. patent application Ser. No. 09/285,099, filed on Apr. 2, 1999.

FIELD AND BACKGROUND OF THE INVENTION

The present invention relates to a system and method for automatically analyzing the flow of traffic through a network, and in particular, for such a system and method in which software agents are distributed throughout the network according to a physical topology map in order to gather the traffic information.

Networks, including local area networks (LAN) and wide area networks (WAN), are becoming increasingly prevalent as the number of computers in organizations grows. Networks enable information to be shared between computers, and as such are important for the ease and convenience of storing and accessing data throughout an organization. Networks are implemented with a physical connection between at least two computers or other network hardware devices. This physical connection can be implemented through various types of physical connection media, including but not limited to, a cable or wireless communication, including optical, infra-red and radiowave based signals. Data is passed through this physical connection according to various protocols at different layers of the network. These protocols include but are not limited to, transmission control protocol (TCP), Internet protocol (IP), Internet packet exchange (IPX), systems network architecture (SNA), datagram delivery protocol (DDP) and so forth. At the data link layer, such protocols include, but are not limited to, Ethernet, token ring, fiber distributed data interface (FDDI) and so forth.

The traffic which passes through such a network must be monitored in order to maintain an efficient network. The flow of packets through the network is analyzed by detecting packets as they are transported from point to point on the network. Although there are known methods in the background art for detecting the flow of these packets, these methods have various limitations and disadvantages. For example, the standard for SNMP (Simple Network Management Protocol) includes a MIB (Management Information Base) about packet flow at a very high level, such that the number of packets being transmitted according to the TCP, UDP or ICMP protocols is detected, but not the source or destination network elements for these packets (see RFC 1156). Clearly, this information is not sufficient in order to provide a detailed analysis of the packet flows through the network.

More information is gathered according to a new version of this standard in the RMON standard (RFC 1213). The RMON standard is the basis for a number of hardware products, including OpenView™ (Hewlett-Packard, USA). In addition, software products based on RMON are also available. Products which are based on RMON suffer from a number of disadvantages. First, many individual hardware devices and/or software packages must be purchased and installed in order to effectively gather traffic information. Second, information is gathered according to user-configured thresholds, which must be separately configured for each hardware device at the device itself, such that central control is not possible. Third, the information is gathered in a manner which can overload the network, since the information is collected from the hardware devices and/or software packages through polling. Not only are large amounts of data collected each time, but additional polling can be triggered if a particular environmental condition is detected by an RMON-based hardware or software product, further overloading the network. Fourth, although this product is able to gather more information than previous versions of SNMP, data is collected separately for the source and destination addresses of packets and the network protocols according to which the packets were sent, such that the two types of data are difficult to correlate. Thus, RMON-based hardware and software products clearly cannot provide the detailed information required for a full analysis of the traffic flow through the network.

Other currently available products include "sniffer" software products, which are proprietary traffic flow detection software programs. These "sniffer" products suffer from the disadvantage of gathering too much information in an unfiltered manner, such that the useful information is hidden in a great deal of useless information. Furthermore, the excessive amount of gathered data can overload the network, while obscuring the important information for traffic analysis.

Other background art methods are disclosed in U.S. Pat. No. 5,430,709 and in U.S. Pat. No. 5,568,471. U.S. Pat. No. 5,430,709 discloses a method for monitoring communication over a network according to a particular protocol, such as the TCP/IP protocol. However, the disclosed method is limited to processing datagrams, as required for TCP/IP, and hence is not suitable for other types of traffic on a network. In addition, the method is particularly directed to monitoring sessions, rather than to collecting continuous information about traffic flow.

U.S. Pat. No. 5,568,471 also teaches a system and method with limited functionality. The disclosed invention is limited to operation with a single network element. The concept of collecting traffic data from a plurality of network elements is neither taught nor suggested. Certainly, the correlation of such data with a physical topology map is neither taught nor suggested. Thus, the disclosed system and method are quite limited and have a number of drawbacks.

One additional disadvantage of all of these background art methods for traffic analysis is that they do not adequately exploit information obtained from physical topology mapping. Various methods for determining the physical topology of a network are known in the art. One such method is disclosed in U.S. patent application Ser. No. 09/285,099, filed on Apr. 2, 1999, incorporated by reference as if fully set forth herein. An accurate picture of the physical topology is an important prerequisite for determining the traffic flow or "traffic topology map" of a network. Thus, the background art methods are also deficient for failing to directly incorporate physical topology information into the analysis of traffic flow through the network.

There is thus a need for, and it would be useful to have, a system and a method for automatic detection of the flow of traffic through a network without requiring specialized hardware devices, which is sufficiently flexible to permit mapping through substantially the entirety of all nodes in the network and which is able to analyze the flow of traffic through the network according to the physical topology map.

BRIEF DESCRIPTION OF THE DRAWINGS

The foregoing and other objects, aspects and advantages will be better understood from the following detailed description of a preferred embodiment of the invention with reference to the drawings, wherein.

SUMMARY OF THE INVENTION

The present invention is of a system and a method for automatic analysis of the traffic topology map of the network, by correlating information from agents which are in communication with the network. The physical topology map is used as a foundation for the traffic mapping process, such that the physical topology map is required for the operation of the present invention. This physical topology map is used in order to guide the installation and deployment of agents throughout the network, thereby optionally and preferably guaranteeing full coverage of the network with the agents and minimizing the amount of redundant or even duplicate data which is reported. Alternatively and preferably, the agents can be installed on selected network elements, again through the guidance of the physical topology map. These selected network elements are optionally server computers or other computers which interact with a large portion of the population of network elements, in order to provide adequate coverage of the network while requiring fewer agents to be deployed. The traffic mapping process then analyzes the traffic flow between the network elements. Thus, for the method of the present invention, the exact process by which the physical map is determined is not important. However, the physical topology map does reduce redundancy of collected data since the physical location of the computer or other network element operating each agent is known.

According to the present invention, there is provided a method for automatically analyzing a traffic flow for a plurality of network elements on a network, the network element being connected to the network through a hardware connector, the method comprising the steps of: (a) providing a physical topology map of the network; (b) selecting a selected plurality of network elements on the network according to the physical topology map, such that the selected plurality of network elements are distributed throughout the network; (c) setting the hardware connector of each of the selected plurality of network elements to detect packets flowing through the network; (d) analyzing each detected packet to determine at least a source address and a destination address for the detected packet; and (e) sorting the source addresses and the destination addresses for the detected packets to determine traffic information between each pair of network elements exchanging at least one packet, such that the traffic flow for the plurality of network elements is determined.

According to another embodiment of the present invention, there is provided a system for automatic traffic mapping of a plurality of network elements on a network, the network element being connected to the network through a hardware connector, comprising: (a) a plurality of agents, each of the plurality of agents being operated by a network element, for receiving packets from the network through the hardware connector, and for analyzing the packets to determine at least a source address and a destination address for the packets; and (b) a central management engine (CME) for receiving the source address and the destination address for the packets, and for determining a frequency of packet flow between each pair of the network elements, the traffic map being determined according to the frequency of traffic flow.

Hereinafter, the term "network" refers to a connection between any two computers which permits the transmission of data. Hereinafter, the term "computer" includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; or any other known and available operating system, including operating systems such as Windows CE™ for embedded systems, including cellular telephones, handheld computational devices and palmtop computational devices, and any other computational device which can be connected to a network. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Inc. (USA).

The term "relative location" of two network elements refers to the logical placement of the two elements within the network in relation to each other, rather than according to any fixed physical location in the network.

Hereinafter, the term "section" refers to any portion of a network, including but not limited to, a segment and/or a sub-network.

Hereinafter, the term "user" is the person who operates the graphical user interface and interacts with software implemented according to the present invention.

The present invention could be described as a series of steps implemented by a data processor, such that the present invention could be implemented as hardware, software or firmware, or a combination thereof. For the present invention, a software application could be written in substantially suitable programming language, which could easily be selected by one of ordinary skill in the art. The programming language chosen should be compatible with the computer by which the software application is executed. Examples of suitable programming languages include, but are not limited to, C, C++ and Java.

DETAILED DESCRIPTION OF THE INVENTION

The present invention is of a system and a method for automatic analysis of the traffic topology map of the network, by correlating information from agents which are in communication with the network. The physical topology map provides the foundation for the traffic mapping process, in order to guide the installation and deployment of agents throughout the network. Therefore, the physical topology map is required for the operation of the present invention. The traffic mapping process then analyzes the traffic flow between the network elements. Thus, for the method of the present invention, the exact process by which the physical map is determined is not important.

However, the physical topology map does reduce redundancy of collected data since the physical location of the computer or other network element operating each agent is known. The agents are preferably evenly distributed throughout the network for complete coverage of network traffic, and more preferably are distributed such that each segment has at least one associated agent, thereby optionally and preferably guaranteeing full coverage of the network with the agents. Alternatively and preferably, the agents can be installed on selected network elements, such as server computers or other, computers which interact with a large portion of the population of network elements, in order to provide adequate coverage of the network while requiring fewer agents to be deployed. Thus, the method and system of the present invention enable the map of the traffic flow of the network to be automatically constructed from an analysis of the traffic information obtained from the agents.

In addition, the method and system of the present invention enable the physical topology map to be corrected and updated according to traffic information which is correlated with the physical topology. Thus, there is a feedback loop between the traffic information and the physical topology map during the operation of the present invention, which enables each type of data to be more accurately and efficiently determined through an analysis of both types of data.

The principles and operation of a method and system according to the present invention may be better understood with reference to the drawings and the accompanying description, it being understood that these drawings are given for illustrative purposes only and are not meant to be limiting.

Figure 1:
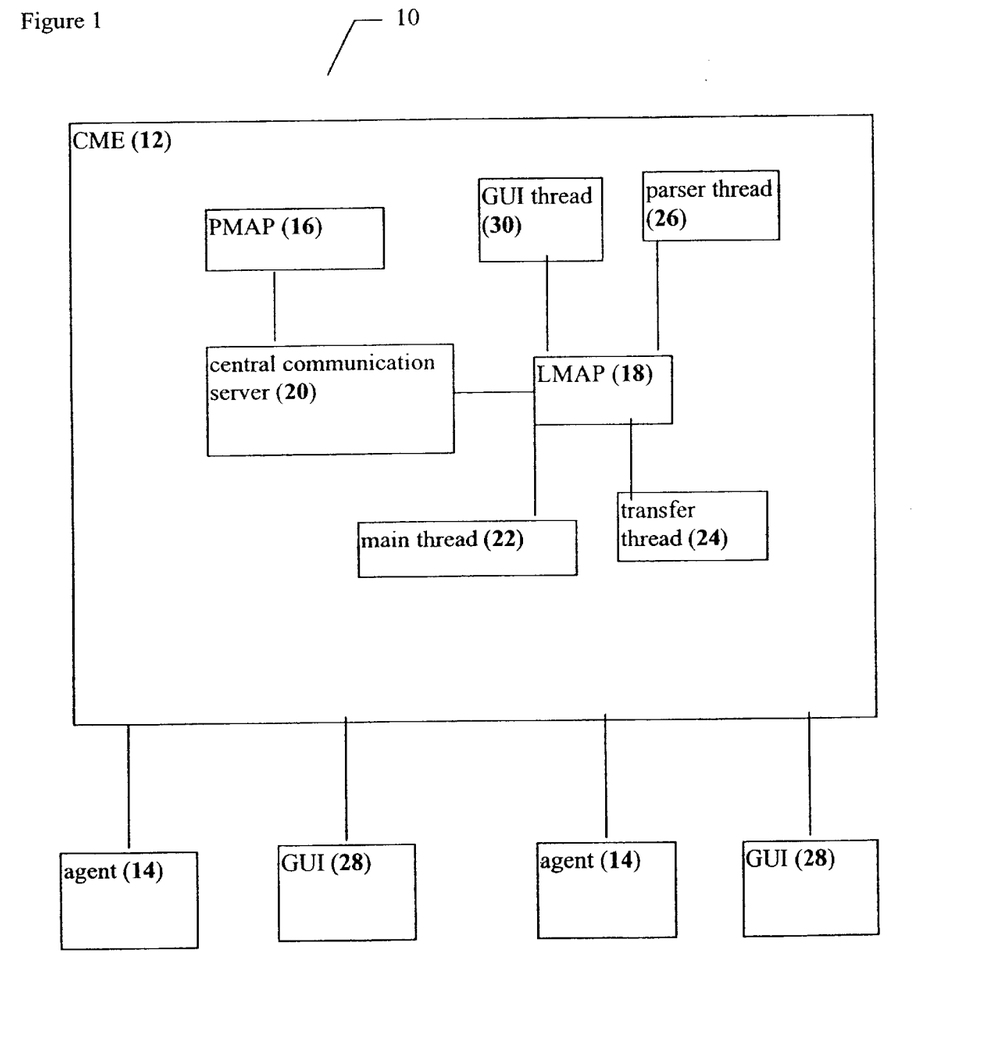
FIG. 1 is a schematic block diagram of an illustrative system according to the present invention.

Referring now to the drawings, FIG. 1 is a schematic block diagram of software modules in a system 10 for automatic physical network topology detection. System 10 features a central management engine (CME) 12, which is a package of software modules operated by a computer in the network, or alternatively which could be embodied as a single software program, as hardware or as firmware. As described herein, CME 12 is embodied as a package of software modules for the purposes of discussion and without intending to be limiting in any way. It is understood that this particular implementation is preferred but is for the purposes of illustration only and is not intending to be limiting in any way. Other configurations of CME 12 are possible and are contemplated as being within the scope of the present invention. It is also understood that each process is a function of CME 12 which is described separately for the sake of discussion only, such that these processes could be implemented as a single software application. In addition, naming each process separately is also for the purposes of clarity, and is not intended to limit the functionality associated with each process to that particular named process alone.

CME 12 receives information from a plurality of agents 14, which are described herein as software modules operated by other computers in the network. As for CME 12, these agents 14 can also optionally be embodied as firmware or hardware, although the following description centers upon agents 14 as software modules being operated by a computer or other electronic device connected to the network. Agents 14 are able to send information to, and receive instructions from, CME 12 through the network. Preferably agents 14 are distributed through the network in order to provide the most detailed and accurate traffic topology map of the network. The distribution of agents 14 is guided by the physical topology map of the network, which is required for the initial distribution of agents 14. Most preferably, agents 14 are distributed such that each network segment has at least one associated agent 14, thereby optionally and preferably guaranteeing full coverage of the network with the agents. Alternatively and preferably, agents 14 are installed on selected network elements, such as server computers or other computers which interact with a large portion of the population of network elements, in order to provide adequate coverage of the network while requiring fewer agents 14 to be deployed.

However, the actual method from which the physical topology map is obtained is less important. For example, the physical topology of the network could be determined manually. Alternatively and more preferably, the physical topology map of the network is determined according to the methods disclosed in U.S. patent application Ser. No. 09/285,099, filed on Apr. 2, 1999, incorporated above by reference. Deploying agents 14 according to the physical topology map, regardless of the method by which the map is obtained, reduces redundancy in the collected data. Furthermore, according to an optional but preferred embodiment of the present invention, if an agent 14 cannot be placed at a particular desired network element, for example for security reasons, port mirroring is optionally used to install agent 14 on a mirroring network element. Port mirroring is a property of hardware switches in the network, and enables traffic flowing over a monitored port to be detected through a monitor port, to which the mirroring network element would be connected.

Figure 2:
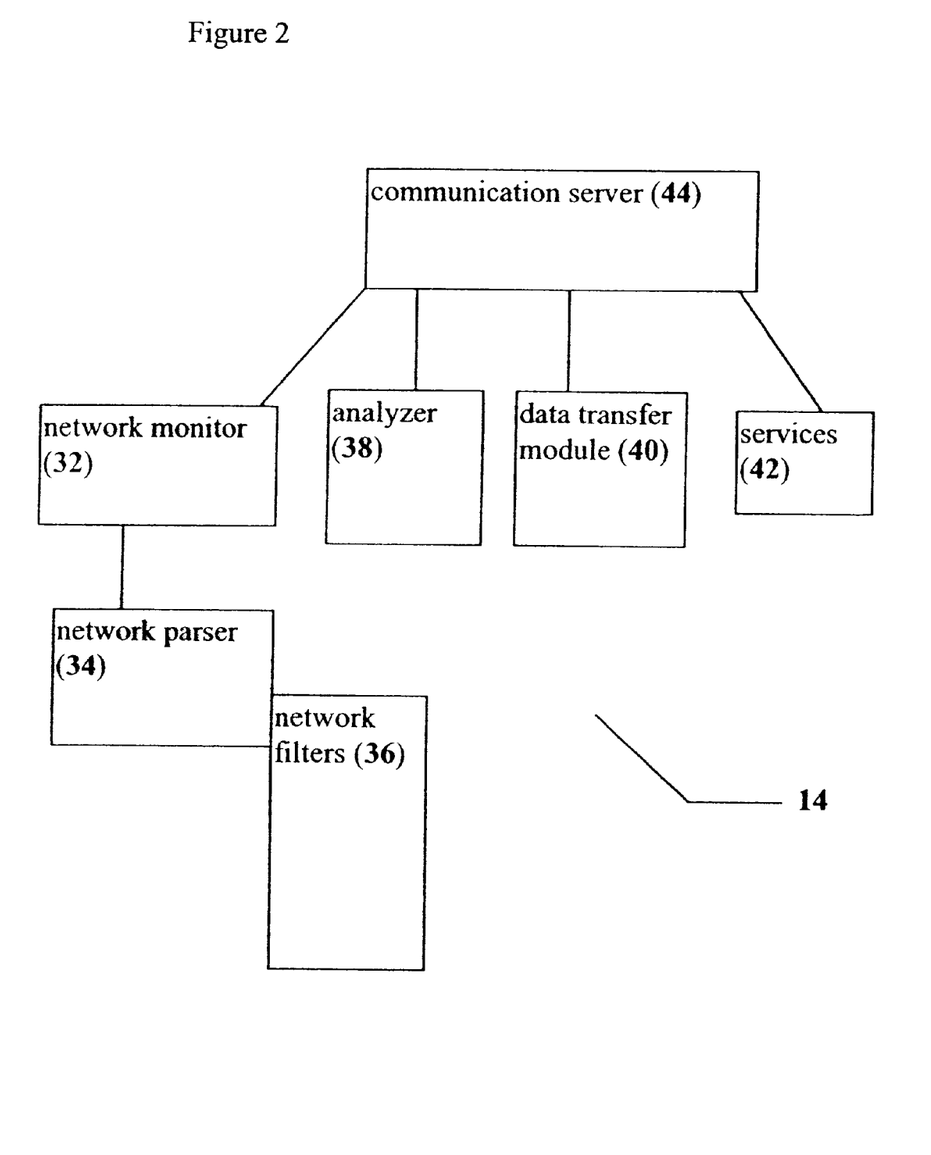
FIG. 2 is a schematic block diagram of an illustrative embodiment of an agent according to the present invention.

Turning now to FIG. 2, preferred features of agents 14 are shown. It is understood that this particular implementation of agents 14 is preferred but is described for the purposes of illustration only and is not intending to be limiting in any way. Other configurations of agents 14 are possible and are contemplated as being within the scope of the present invention. Optionally and preferably, agent 14 is a software module which is operated by any type of end node device. As shown, agent 14 features a network monitor 32 which interacts with the network card, or other network connector hardware device, of the computer which operates agent 14. Network monitor 32 both detects any information received through the network card, and is able to instruct the network card to operate in promiscuous mode. In promiscuous mode, the network card receives all packets traveling through the network segment, even if these packets are not specifically addressed to that particular network card itself. Setting the network card to operate in promiscuous mode is only an example of one mechanism for eavesdropping on network traffic flowing past the network element on the network. Adapted mechanisms could be used for eavesdropping on network traffic for networks operating through microwave transmissions or fiber optic, for example, which do not operate with network interface cards. Such adaptations could easily be performed by one of ordinary skill in the art.

The information which is received by network monitor 32 is then sent to a network parser 34, which filters the data according to at least one parser filter 36. Network parser 34 sorts each frame of the received network traffic through parser filter 36 according to at least one characteristic of the frame, such as the source address, the destination address, type of frame, protocol according to which the data is sent, and so forth. Network parser 34 then summarizes the sorted data, which is stored in an associated database (not shown). The stored data enables network parser 34 to recognize frames with a known source address or a known destination address.

If network parser 34 captures a frame with an unknown source address and an unknown destination address, network parser 34 passes this frame to an analyzer 38. Analyzer 38 then examines this frame and sends an event to CME 12 (not shown) if both the source and destination addresses are unknown, to indicate that a new source or destination network element (or both) has been discovered. Alternatively, analyzer 38 could send an event to CME 12 if only one of the source and destination addresses is unknown. The discovery of such a new machine on the network preferably triggers the process of examining the new machine in order to collect more network information about the new machine by CME 12, which receives the event, as described in greater detail in U.S. patent application Ser. No. 09/285,099 (previously incorporated by reference). Alternatively and preferably, agents 14 could also exchange frames as "friends" in an attempt to map the unknown network element on the network, as described in greater detail below.

In addition, preferably a data transfer module 40 is used to send large amounts of data, other than events, to CME 12 by sending binary files. Data transfer module 40 optionally and preferably operates according to a TCP-based protocol for transferring data to CME 12, in particular for sending data to LMAP module 18. In addition to the TCP/IP protocol for sending data, other alternative protocols which may be used include but are not limited to UDP, and SNA for agents 14 which are in communication with a token ring.

A service module 42 is optionally and preferably used to send test packets, for example through the ICMP echo command, also known as the "Ping" software utility, available on many operating systems, for sending such test packets to a specified destination address. Of course, other such utilities could be used for sending test packets by service module 42.

Overall control of agent 14 is preferably performed by a communication service module 44, which listens for commands from CME 12. Optionally and preferably, service module 44 listens for these commands on a special port, although for other implementations, such as in an SNA environment, such a special port may not be required and/or practical. The commands from CME 12 include, for example, a command to begin collecting and transmitting information, or alternatively a command to stop such transmission, as previously described. Communication service module 44 receives each such command and parses the command in a suitable format for agent 14. Communication service module 44 then alters the function of one or more of the modules of agent 14 according to the received command.

Turning again to FIG. 1, CME 12 includes a PMAP module 16 and an LMAP module 18, which are optionally and preferably connected to each other through a central communication server 20. PMAP module 16 maintains the map of the physical topology, for example by receiving updated information from agents 14 or through a query of SNMP information stored in network elements such as bridging tables. PMAP module 16 stores the physical topology map in an associated database (not shown). Upon receipt of a command from the user, PMAP module 16 selects a plurality, but not necessarily the entirety, of agents 14 to monitor traffic between network elements.

Preferably, only one agent 14 per network segment monitors the traffic. However, as noted previously, each network segment does not require an agent 14 to be installed in order for adequate traffic information to be collected. PMAP module 16 then activates agent 14 through a command sent to communication server 40, as described in FIG. 2. If an agent 14 fails to respond to the request to monitor the traffic, then more preferably another agent 14 on the same segment is activated by PMAP module 16.

The selected and activated agents 14 then begin to monitor network traffic, preferably by activating the associated hardware connection to the network in "promiscuous" mode. Network monitor 32 receives these packets, which are then analyzed by network parser 34 according to at least one parser filter 36 as described with regard to FIG. 2. In particular, network parser 34 analyzes the header of each received packet for the source and destination addresses, which could be MAC (media access control) addresses, IP (Internet protocol) addresses or both. Monitoring of IP addresses would be required for certain types of packets, such as those received across a WAN (wide area network). Preferably, network parser 34 also determines the network protocol for the data contained in the packet. Network parser 34 then stores this information in preallocated files and/or some type of buffer.

After a predetermined period of time has elapsed, and/or after the buffer or other data storage space becomes filled with information, agent 14 sends an event to CME 12 and then reports the collected data to CME 12 in a file through a file transfer procedure. Optionally and more preferably, the user is able to determine the length for this period of time and/or the maximum permitted data storage size by sending a command to CME 12. This embodiment has the advantage that each agent 14 determines when the data is ready to be sent, thereby obviating the need for polling agents 14 by CME 12 and increasing the efficiency of sending and receiving information through the network with a minimal network load.

LMAP module 18 collects these agent-reported events and files as they are received by CME 12, and preferably places these events and files in a queue. LMAP 18 is optionally and preferably implemented as a multi-threaded process, more preferably including at least a main thread 22 and at least one transfer thread 24. Main thread 22 receives each event as it arrives, and passes it to transfer thread 24. Optionally and preferably, main thread 22 is able to send a command to agents 14 to increase the period of time which elapses and/or the size of the filled data storage before files are reported, if the queue becomes filled too quickly. Transfer thread 24 then transfers the corresponding received file from the queue to a parser thread 26, which examines and correlates the received information from the file. Parser thread 26 then places the analyzed information in a data storage area, such as a memory-mapped file and/or a relational database, for example (not shown). This information is optionally stored in records, which are created when the user first requests the collection of the traffic information, and which are then added to during the time of monitoring the traffic.

The analyzed information is then correlated in time by division into quanta. The user could request that the traffic be monitored for a particular period of time, which is the reporting period, and optionally could also request a particular frequency of monitoring, such that the data would be analyzed with regard to time slots set according to the frequency of monitoring. The data within the time slots are then adjusted to account for differences in the times at which the agents 14 send events to CME 12. Thus, the quanta are determined according to both the reporting period and to time slots within that period, Optionally and preferably, once a particular set of network elements has been determined to be sending and/or receiving packets, this data is correlated in order to avoid redundancy. For example, each exchange of packets involves two network elements, each of which may be operating an agent 14, such that the data concerning these exchanges is reported twice. Correlation is therefore performed such that these packets are only counted once. Similarly, a network element which is broadcasting packets may be heard by many, if not all, agents 14. Again, preferably correlation is performed such that the broadcast packets are only counted once.

Correlation is also preferably used to determine the most accurate count for the number of frames exchanged where different agents 14 report different numbers of detected frames. Preferably, the particular agent 14 with the highest number of detected frames per time slot or quanta is used as the definitive determination for the number of frames sent.

Figure 3:
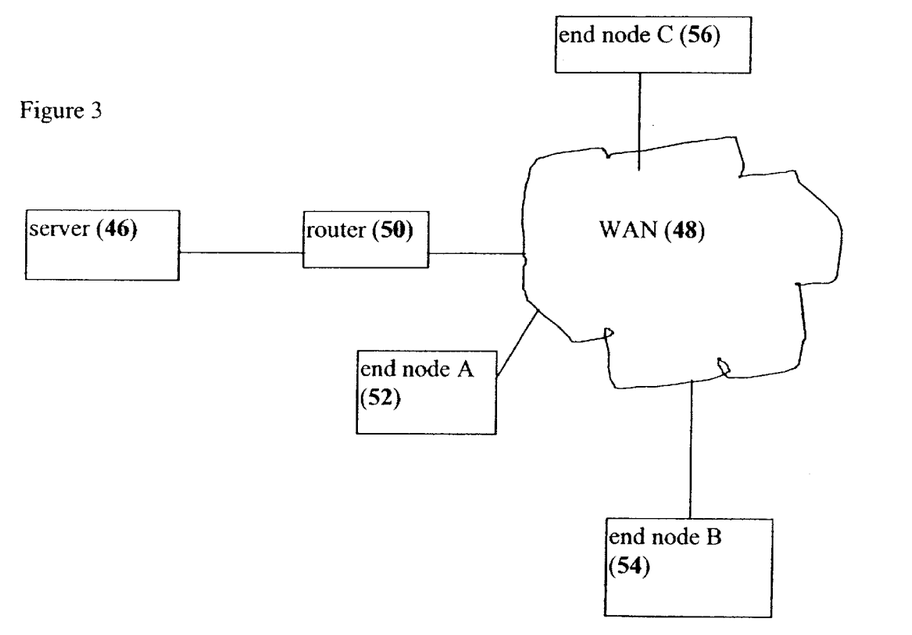
FIG. 3 is a schematic block diagram of an illustrative embodiment of a first exemplary network portion for demonstrating the method of the present invention.

Another optional but preferred type of correlation is performed between layer 2 and layer 3 address information, such as MAC address and IP address information for example. Hereinafter, the terms "layer 2" and "layer 3" refer to the OSI (Open Systems Interconnect) model of network communication. Such correlation enables the traffic information to be more completely analyzed, since more information is available by combining both types of addresses than from each type of address separately. For example, as shown in FIG. 3, a server 46 is connected to a WAN 48 through a router 50. WAN 48 in turn is connected to three end node network elements, shown as an end node A 52, an end node B 54 and an end node C 56. When layer 2 addresses are analyzed, server 46 appears to be connected only to router 50. However, when layer 3 addresses are analyzed, server 46 appears to be connected only to end node A 52, end node B 54 and end node C 56. The correct relationships between server 46, router 50, end node A 52, end node B 54 and end node C 56 are determined by correlating the layer 2 and layer 3 addresses.

More specifically, layer 2 links represent traffic inside a LAN (local area network). A LAN can be represented as a graph where the nodes are the net elements. The correlation between the physical topology map and the traffic information is therefore performed by finding the correct path in the graph which connects the two net elements in the link.

Figure 4:
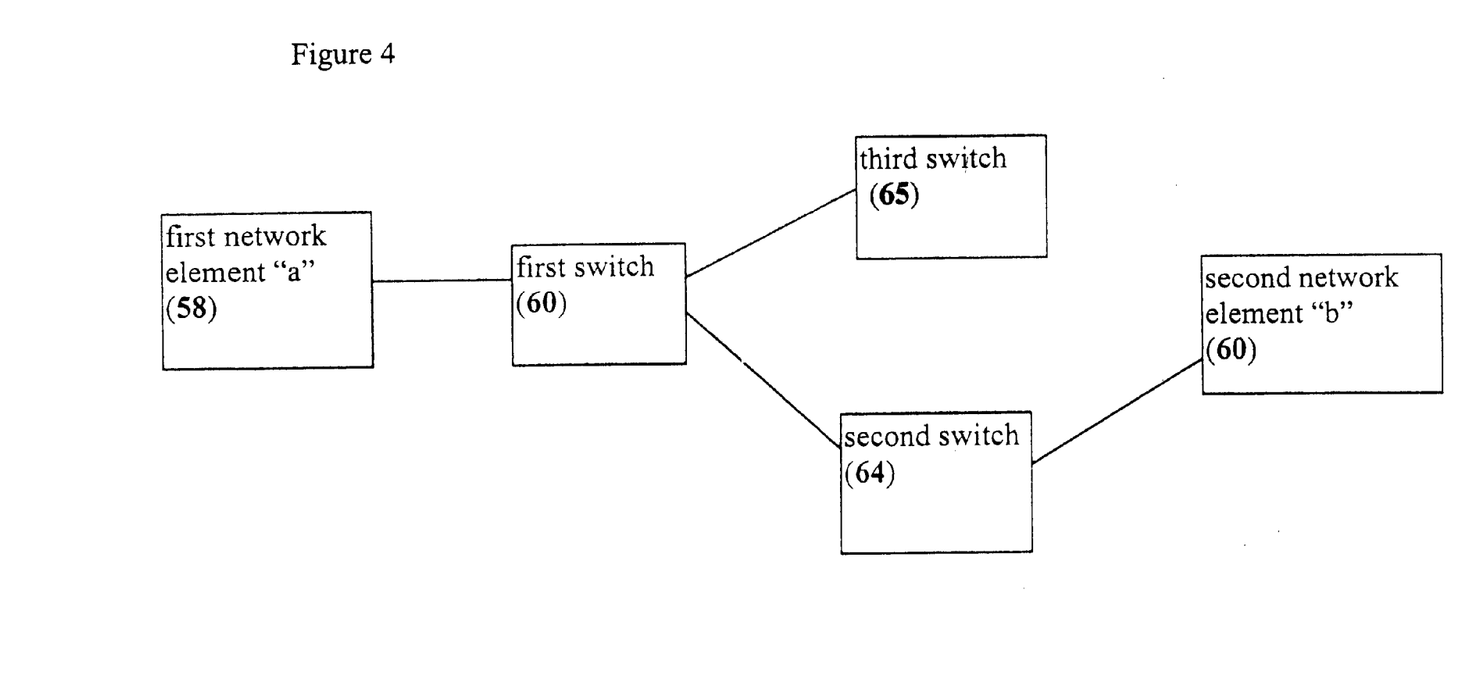
FIG. 4 is a schematic block diagram of an illustrative embodiment of a second exemplary network portion for demonstrating the method of the present invention.

If the LAN has no loops, there can be only one path between any two points in the graph. Otherwise, if there is more then one path, the correct path is found by using bridging information from the switches. For example, as shown in FIG. 4, a first net element "a" 58 is connected to a first switch 60, and then through some path to a second network element "b" 62. This path could lead from first switch 60 through either a second switch 64 or a third switch 65. In this example, by examining the bridging information from first switch 60, second network element "b" 62 is shown to be located on the interface connected to second switch 64, rather than on the interface connected to third switch 65. Thus, the correct path can be located from the bridging information.

Correlation of a layer 3 link to the physical topology is performed by first correlating this link to a plurality of layer 2 links. The layer 3 link is correlated to the plurality of layer 2 links by examining the traffic and determining which layer 2 addresses are used with the layer 3 addresses of these links. Next, each of the layer 2 links are correlated according to the method described above. Thus, the physical topology information can be correlated to the traffic information as described.

Optionally, the analyzed data is made available to the user only after all requested and activated agents 14 have sent the files to LMAP 18, such that the database is preferably locked until all the data is received and analyzed. This ensures data coherence, since agents 14 may report to LMAP 18 at different times. Alternatively and preferably, LMAP 18 waits for a reasonable period of time for agents 14 to report. Any data which is sent after this period of time is ignored by LMAP 18. Thus, in this preferred embodiment, data coherence is provided without locking the database.

In order to further provide data coherence, if an agent 14 does not report for a portion of the requested reporting period, preferably data from that portion of the reporting period is not included in the final report or analysis, since data for that time period is not complete. More preferably, the lack of availability of data from that portion of the reporting period is indicated to the user through alteration of some part of the GUI, as described in further detail below.

Various types of additional data analysis are preferably also available, more preferably according to a command received from the user, in order to further clarify and display the data to the user. For example, the start time and end time for the reporting period can be specified either in terms of absolute times or relative times. Absolute times are given in terms of the date and the specific hour and minute at which reporting is either to begin or to end. Relative times are given relative to the present time at which the user requests reporting. For example, the user could request that the reporting period start two hours previously and end either at the present time, or even in the future. For the time resolution (frequency of data collection), the user could request the display of information which is sorted into time slots (quanta) of 1 minute, 5 minutes and so forth, or substantially any desired time frequency.

The user could also request that the data be filtered according to a particular network protocol, for example. As another example, the user could optionally request that the data be subjected to a threshold filter, in order to eliminate network elements which have the highest or lowest rates of reporting. By filtering these connections according to a request from the user, the user is able to obtain a more clear visual picture of the monitored traffic.

System 10 also preferably features at least one, and preferably a plurality of, graphical user interfaces 28 for interaction between the user and CME 12. Graphical user interface 28 displays the analyzed traffic data and the resultant traffic flow patterns to the user, as well as accepting instructions from the user to send to CME 12. Even without graphical user interface 28, however, the information about the traffic map could still be displayed to the user through other display mechanisms. Graphical user interface 28 also accepts commands and information from the user, which are then sent to a GUI thread 30 of LMAP module 18.

GUI thread 30 receives the request from the user, and then temporarily locks the database, such that parser thread 26 is temporarily unable to access this database. GUI thread 30 then retrieves the requested information, builds a message and then returns this message to GUI 28. The message is then displayed to the user, preferably in the form of a graphic image.

Figure 5:
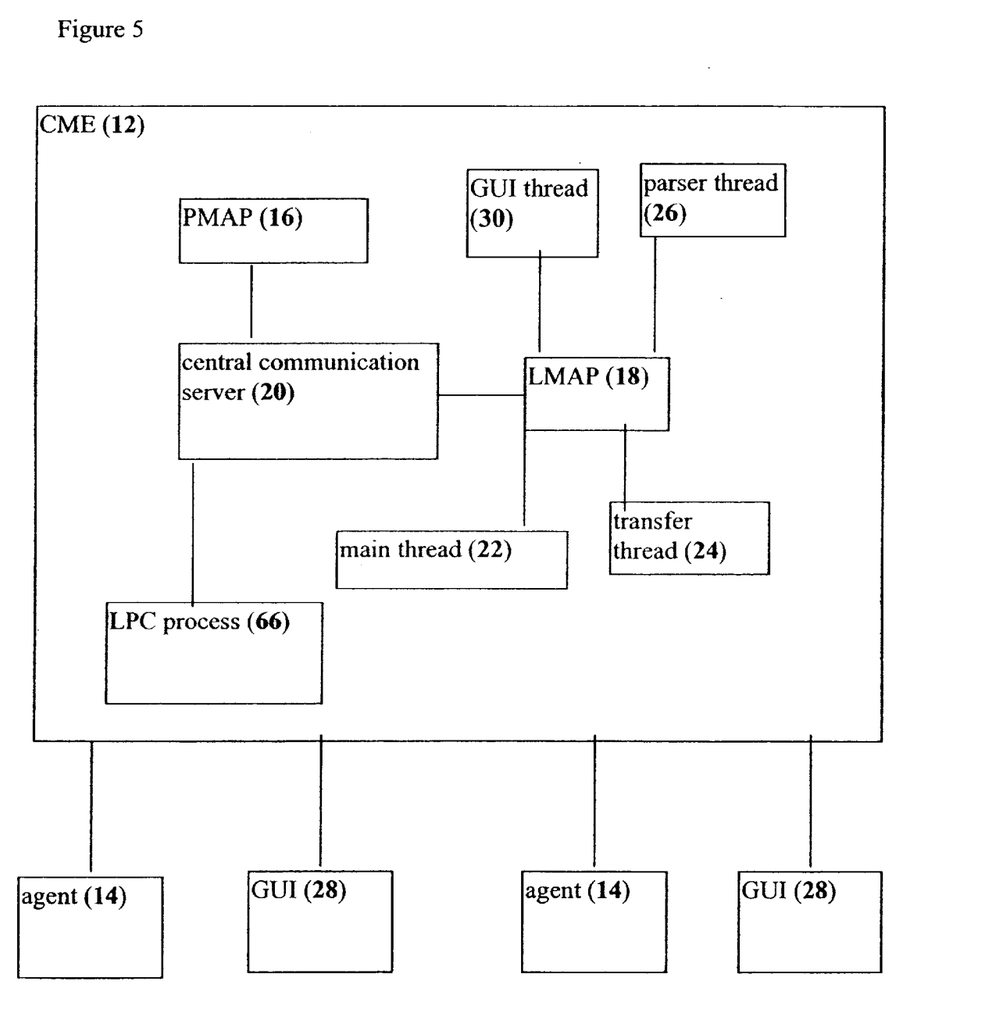
FIG. 5 is an illustrative schematic block diagram of a second embodiment of the system of FIG. 1.

According to yet another preferred embodiment of the present invention, as shown in FIG. 5, CME 12 includes a LPC process 66 in order to more accurately determine and update the physical topology of the network from the traffic data. LPC process 66 performs a logical to physical correlation, according to traffic information received from agents 14 and analyzed by LMAP module 18, in order to determine if any changes may have occurred in the physical topology of the network. The received traffic information is preferably compared to the physical topology map of the network, which is obtained from PMAP module 16. If the physical topology and logical packet flow information do not correlate, and in particular if there are gaps in the logical packet flow information which should not occur according to the physical topology map, then LPC process 66 optionally and preferably sends test packets. Thus, the correlation of the traffic and physical topology information by LPC process 66 enables changes to the physical topology map to be detected which would otherwise not be detected.

Agents 14 are preferably able to determine the physical location of the new and/or moved network element according to the "friends" method disclosed in U.S. patent application Ser. No. 09/285,099. Briefly, the particular agent 14 which detects the unknown network element requests a "friend" agent 14, which is located on a different network segment and which could either be previous assigned or alternatively selected at random, to send frames to this element. The first agent 14 then listens for these frames. If the first agent 14 is able to hear the frames from the "friend" agent 14, while the reverse is not true, then the unknown network element is probably located on the same network segment as the first agent 14.

Figure 6:
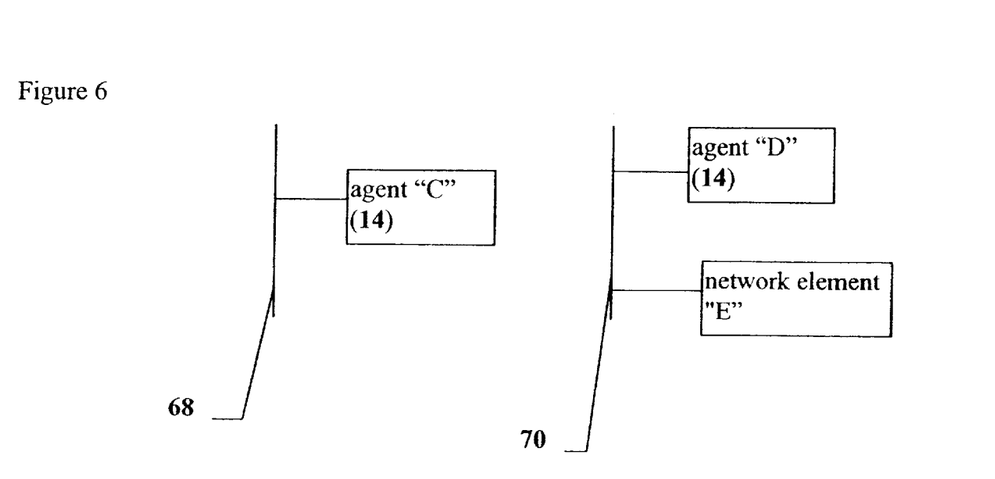
FIG. 6 is an illustrative schematic block diagram of a portion of a network for demonstrating the method of the present invention.

Examples of these two particularly preferred features of this embodiment are described with regard to FIG. 6, which shows a first network segment 68 with an agent 14 labeled "C", and a second network segment 70 with one agent 14 labeled "D", and a network element labeled "E". According to this partial physical topology map, if network element "E" sends packets to agent "C", then agent "D" must overhear this traffic. If agent "D" does not hear this traffic, then LPC module 66 would determine that there might be an error in the physical topology map. For example, LPC module 66 could analyze the map of known segments to determine if any contradiction exists.

Alternatively, if agent "D" is able to overhear traffic between the computer operating agent "C" and an unknown computer which is not on second network segment 70, then agent "D" would determine that the physical topology map may have changed. Preferably, each agent 14 would need to hear packets with unknown source and destination addresses for more than three frames as the threshold for determining that the physical topology may have been changed. If the threshold is passed, then agent "D" would request a friend agent 14, such as agent "C", to help agent "D" to map the unknown network element as previously described.

Figure 7:
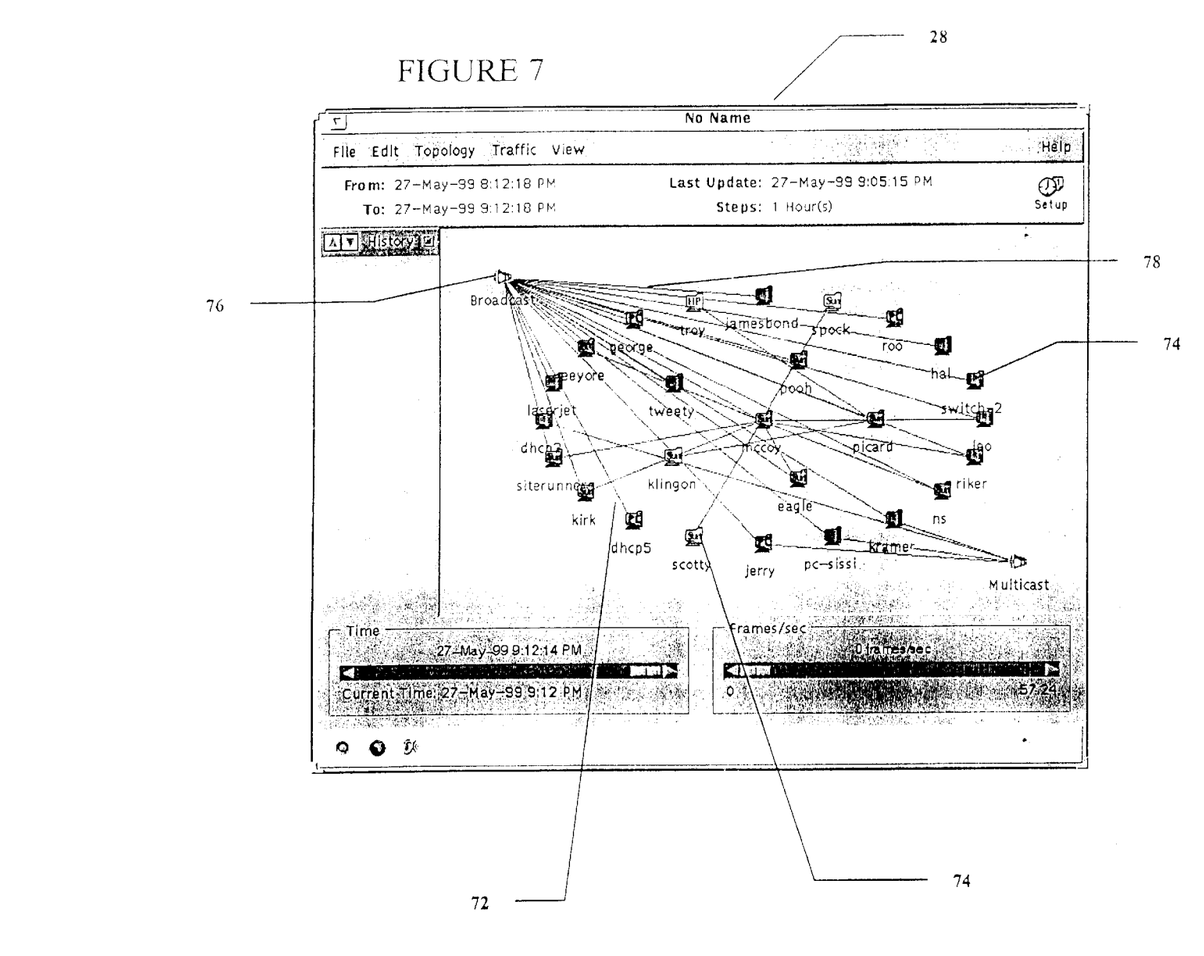
FIG. 7 is an illustration of a GUI for displaying a broadcast node according to the present invention.

A particularly preferred embodiment of information displayed on GUI 28 is shown in FIG. 7, with a plurality of links 72 connected to icons 74 representing individual network elements. Optionally and more preferably, a broadcast end node 76 is used to represent multicast and/or broadcast traffic is shown as a separate entity in one corner of GUI display 28, optionally without any links 72 since the huge number of connections may obscure the entire display.

According to preferred embodiments of the present invention, the user is able to view the correlation between the traffic and physical topology maps. For example, the user could request to see a picture of the physical topology map, and could then "node hop" by selecting each network element in turn and requesting the traffic data for that network element. This traffic data would be displayed in the context of the physical map, and would therefore show the user how the network traffic affects the performance of other network elements.

Figure 8A:
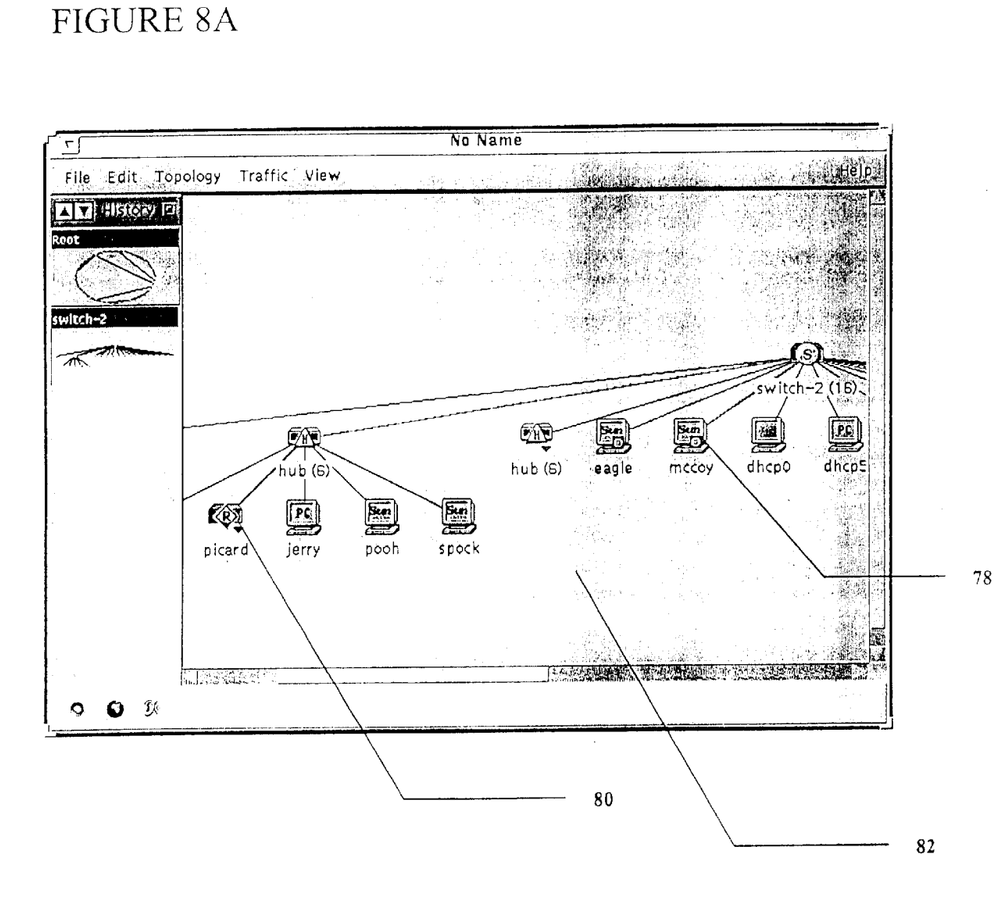
FIGS. 8A and 8B illustrate an exemplary correlation between a physical topology map and a traffic map according to the present invention.
Figure 8B:
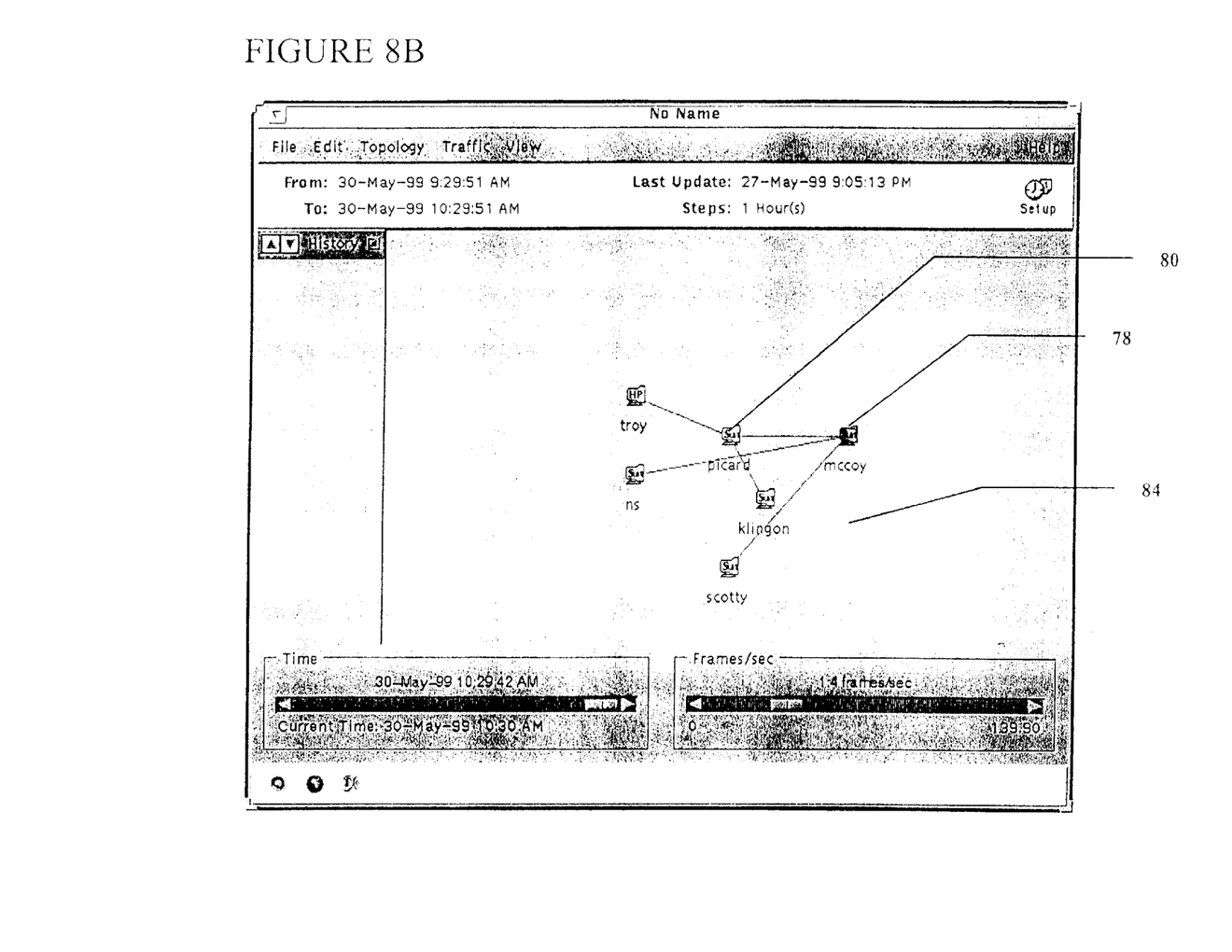

Alternatively, as shown in FIGS. 8A and 8B, a particular traffic map connection between two end nodes could be selected, and then displayed on both a physical topology map and a traffic map. FIG. 8A shows a highlighted path between a first end node 78 and a second end node 80 on a physical topology map 82. FIG. 8B shows the same path on a traffic topology map 84. Of course, on traffic topology map 84, the connection between first end node 78 and second end node 80 is shown as a direct link. Physical topology map 82 displays the physical connections which are required for such traffic to flow between first end node 78 and second end node 80.

It will be appreciated that the above descriptions are intended only to serve as examples, and that many other embodiments are possible within the spirit and the scope of the present invention.

What is claimed is:

1. A method for automatically analyzing a traffic flow for a plurality of network elements on a network, each of the plurality of network elements being connected to the network through a hardware connector, the method comprising the steps of:
   (a) providing a physical topology map of the network;
   (b) selecting a selected plurality of network elements on the network according to said physical topology map, such that said selected plurality of network elements are distributed in the network;
   (c) setting the hardware connector of each of said selected plurality of network elements to detect packets flowing through the network;
   (d) analyzing each detected packet to determine at least a source address and a destination address for said detected packet;
   (e) sorting said source addresses and destination addresses for said detected packets to determine traffic information between each pair of network elements exchanging at least one packet, such that the traffic flow for said plurality of network elements is determined;
   (f) comparing said physical topology map to said traffic information:
   (g) if there is a discrepancy between said physical topology map and said traffic information, detecting a suspected change in said physical topology of the network;
   (h) examining said suspected change by exchanging test packets between a plurality of the network elements; and
   (i) if said suspected change is an actual change, altering said physical topology map according to said test packets.

2. The method of claim 1, wherein step (e) further comprises the step of:
   (i) analyzing said detected packets to remove packets detected by a plurality of network elements, such that each packet is reported from only one network element.

3. The method of claim 2, wherein step (i) further comprises the step of:
   (A) determining a number of packets sent from a first network element to a second network element according to a largest number of packets reported from one network element.

4. The method of claim 1, wherein step (c) includes the step of:
   (i) collecting packets for a predetermined period of time, such that at least step (e) is not performed until said predetermined period of time has elapsed.

5. The method of claim 1, wherein the network is divided into a plurality of segments and wherein at least one network element is selected for each segment of the network.

6. The method of claim 1, wherein each of said selected plurality of network elements is a computer operating an agent software program, said agent software program collecting said traffic information.

7. A method for automatically analyzing a traffic flow for a plurality of network elements on a network, each of the plurality of network elements being connected to the network through a hardware connector, the method comprising the steps of:

(a) providing a physical topology map of the network;

(b) selecting a selected plurality of network elements on the network according to said physical topology map, such that said selected plurality of network elements are distributed in the network;

(c) setting the hardware connector of each of said selected plurality of network elements to detect packets flowing through the network;

(d) analyzing each detected packet to determine at least a source address and a destination address for said detected packet; and (e) sorting said source addresses and destination addresses for said detected packets to determine traffic information between each pair of network elements exchanging at least one packet, such that the traffic flow for said plurality of network elements is determined;

wherein the network features a plurality of server network elements and wherein only said plurality of server network elements are said selected plurality of network elements.

8. A method for automatically analyzing a traffic flow for a plurality of network elements on a network, each of the plurality of network elements being connected to the network through a hardware connector, the method comprising the steps of:

(a) providing a physical topology map of the network;

(b) selecting a selected plurality of network elements on the network according to said physical topology map, such that said selected plurality of network elements are distributed in the network;

(c) setting the hardware connector of each of said selected plurality of network elements to detect packets flowing through the network;

(d) analyzing each detected packet to determine at least a source address and a destination address for said detected packet;

(e) sorting said source addresses and destination addresses for said detected packets to determine traffic information between each pair of network elements exchanging at least one packed, such that the traffic flow for said plurality of network elements is determined;

(f) comparing said physical topology map to said traffic information; and (g) if there is a discrepancy between said physical topology map and said traffic information, detecting a suspected change in said physical topology of the network, wherein said discrepancy is a lack of expected traffic information between at least two network elements.

9. A method for automatically analyzing a traffic flow for a plurality of network elements on a network, each of the plurality of network elements being connected to the network through a hardware connector, the method comprising the steps of:

(a) providing a physical topology map of the network;

(b) selecting a selected plurality of network elements on the network according to said physical topology map, such that said selected plurality of network elements are distributed in the network;

(c) setting the hardware connector of each of said selected plurality of network elements to detect packets flowing through the network;

(d) analyzing each detected packet to determine at least a source address and a destination address for said detected packet; and (e) sorting said source addresses and destination addresses for said detected packets to determine traffic information between each pair of network elements exchanging at least one packet, such that the traffic flow for said plurality of network elements is determined, the step further comprising the steps of:

(i) determining a link between each pair of network elements exchanging at least one packet; and (ii) constructing a traffic map from said plurality of links;

wherein said link comprises at least one layer 2 link determined for layer 2, and at least one layer 3 link determined for layer 3, both layer 2 address information and layer 3 address information are detected, such that step (i) further comprises the step of correlating layer 2 address information and layer 3 address information in order to correlate said at least one layer 2 link to said at least one layer 3 link.

10. The method of claim 9, wherein step (i) further comprises the step of determining a frequency of traffic flow according to a number of packets traveling on said link per unit of time.

11. The method of claim 9, further comprising the steps of:

(f) displaying the traffic map through a GUI (graphical user interface) display to a user.

12. The method of claim 11, wherein said GUI display features traffic information displayed according to said frequency of traffic flow.

13. The method of claim 12, wherein said frequency is selected by the user.

14. The method of claim 13, wherein steps (a) to (e) are repeated for a reporting period of time, said reporting period of time having a start time and an end time.

15. The method of claim 14, wherein said start time and said end time are selected by the user.

16. The method of claim 15, wherein the traffic map does not include information for a period of time if at least one network element failed to report said traffic information during said period of time.

17. The method of claim 16, wherein each network element in the traffic map is represented by a graphic icon, and each link is represented by a connecting line for connecting said graphic icon, and wherein a special graphic icon representing a broadcasting or multicasting network element is placed at one edge of said GUI display.

18. The method of claim 17, wherein said special graphic icon is represented without any connecting lines representing said links.

19. A system for automatic traffic mapping of a plurality of network elements on a network, the network element being connected to the network through a hardware connector, comprising:

(a) a plurality of agents, each of said plurality of agents being operated by a network element, for receiving packets from the network through the hardware connector, and for analyzing said packets to determine at least a source address and a destination address for said packets; and (b) a central management engine (CME) for receiving said source address and said destination address for said packets, and for determining a frequency of packet flow between each pair of network elements, the traffic map being determined according to said frequency of traffic flow;

wherein at least one network element is a switch, said switch featuring a monitored port and a monitoring port, and wherein said agent is installed on a network element connected to said monitoring port, such that said traffic data is reported from said monitored port.

20. The system of claim 19, wherein at least one network element is an end node.

21. The system of claim 20, wherein said end node operating each of said plurality of agents is a computer and each of said plurality of agents is a software module.

22. The system of claim 21, wherein said computer is connected to the network through a network connector device set to promiscuous mode and said agent further includes:
  (i) a network monitor for binding to said network connector device of said computer and for detecting information received by said network connector device;
  (ii) a network parser for filtering said information detected by said network monitor according to at least one characteristic of said information; and
  (iii) a data transfer module for transferring said information to said CME.

23. The system of claim 22, further comprising:
  (c) a physical topology map, each of the network elements being located on said physical topology map;
wherein said plurality of agents is selected according to a location of each network element on said physical topology map.

24. The system of claim 23, wherein the network is divided into a plurality of segments, such that said plurality of agents is selected such that each segment has only one agent receiving said packets.

25. The system of claim 24, wherein said agent further includes:
  (iv) a database for storing a list of known source addresses and known destination addresses for said information, such that if at least one of a source address or a destination address of said information is not known, said data transfer module sends an event to said CME with said unknown address.

26. The system of claim 24, wherein said CME further comprises a LPC process for comparing the traffic map to said physical topology map to determine if there is a discrepancy between the traffic map and said physical topology map.

27. The system of claim 26, wherein said discrepancy is a suspected network element suspected for moving a location within the network.

28. The system of claim 27, wherein said LPC process sends test packets to said suspected network element and said suspected network element sends response packets to said LPC process, such that if said agents on a segment of said suspected network element hear at least one of said test packets and said response packets, said suspected network element is determined to have moved said location within the network.

29. The system of claim 19, further comprising:
  (c) a graphical user interface for displaying the traffic map.

30. A method for automatically analyzing a traffic flow for a plurality of network elements on a network, each of the plurality of network elements being connected to the network through a hardware connector, the method comprising the steps of:
  (a) providing a physical topology map of the network;
  (b) selecting a selected plurality of network elements on the network according to said physical topology map, such that said selected plurality of network elements are distributed in the network;
  (c) setting the hardware connector of each of said selected plurality of network elements to detect packets flowing through the network;
  (d) analyzing each detected packet to determine at least a source address and a destination address for said detected packet;
  (e) sorting said source addresses and destination addresses for said detected packets to determine traffic information between each pair of network elements exchanging at least one packet, such that the traffic flow for said plurality of network elements is determined, and such that the traffic map does not include information for a period of time if at least one network element failed to report said traffic information during said period of time; and
  (f) displaying the traffic map through a GUI (graphical user interface) display to a user.

31. A system for automatic traffic mapping of a plurality of network elements on a network, the network element being connected to the network through a hardware connector, the network being divided into a plurality of segments, the system comprising:
  (a) a plurality of agents, each of said plurality of agents being operated by a network element, for receiving packets from the network through the hardware connector, and for analyzing said packets to determine at least a source address and a destination address for said packets, each agent including a database for storing a list of known source addresses and known destination addresses for said information, such that if at least one of a source address or a destination address of said information is not known, said agent sends an event to said CME with said unknown address;
  (b) a central management engine (CME) for receiving said source address and said destination address for said packets, and for determining a frequency of packet flow between each pair of network elements, the traffic map being determined according to said frequency of traffic flow; and
  (c) a physical topology map, each of the network elements being located on said physical topology map, such that said plurality of agents is selected according to a location of each network element on said physical topology map;
wherein said CME further comprises a LPC process for comparing the traffic map to said physical topology map to determine if a suspected network element is suspected for moving a location within the network, said LPC process sending test packets to said suspected network element and said suspected network element sending response packets to said LPC process, such that if an agent on a segment of said suspected network element hear at least one of said test packets or said response packets, said suspected network element is determined to have moved said location within the network.

* * * * *